United States Patent
Park et al.

(10) Patent No.: US 9,076,210 B2
(45) Date of Patent: Jul. 7, 2015

(54) METHOD AND APPARATUS FOR ENCODING AND DECODING IMAGE

(71) Applicant: SAMSUNG ELECTRONICS CO., LTD., Suwon-si (KR)

(72) Inventors: Pil-kyu Park, Seoul (KR); Min-woo Park, Hwaseong-si (KR); Chang-hyun Lee, Suwon-si (KR); Dae-sung Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 13/692,258

(22) Filed: Dec. 3, 2012

(65) Prior Publication Data

US 2013/0142447 A1   Jun. 6, 2013

(30) Foreign Application Priority Data

Dec. 2, 2011  (KR) .................. 10-2011-0128532

(51) Int. Cl.
*G06T 9/00* (2006.01)

(52) U.S. Cl.
CPC .................................... *G06T 9/004* (2013.01)

(58) Field of Classification Search
USPC .................. 382/232, 233, 236, 238, 251; 375/240.13
See application file for complete search history.

(56) References Cited

U.S. PATENT DOCUMENTS

| 5,550,847 A * | 8/1996 | Zhu .............................. 714/748 |
| 2007/0014481 A1 * | 1/2007 | Kim et al. ..................... 382/251 |
| 2007/0019871 A1 * | 1/2007 | Kim et al. ..................... 382/236 |
| 2007/0271480 A1 * | 11/2007 | Oh et al. .......................... 714/3 |

\* cited by examiner

*Primary Examiner* — Duy M Dang
(74) *Attorney, Agent, or Firm* — Sughrue Mion, PLLC

(57) ABSTRACT

Methods and apparatuses for encoding and decoding an image in which a block is searched for based on a representative value, rather than being searched for on a pixel-by-pixel basis, thereby search speed may be increased and computational complexity of a search operation may be reduced.

22 Claims, 9 Drawing Sheets

CURRENT FRAME (700)

METHOD AND APPARATUS FOR ENCODING AND DECODING IMAGE

CROSS-REFERENCE TO RELATED PATENT APPLICATION

This application claims priority from Korean Patent Application No. 10-2011-0128532, filed on Dec. 2, 2011, in the Korean Intellectual Property Office, the disclosure of which is incorporated herein by reference in its entirety.

BACKGROUND

1. Field

Exemplary embodiments relate to methods and apparatuses for encoding and decoding an image, and more particularly, to methods and apparatuses for encoding and decoding a screen image that is transmitted from a device, such as a desktop computer, a notebook computer, or a smart phone, to another device.

2. Description of the Related Art

A display device, such as a television (TV) or a beam projector, may be connected to an arithmetic device, such as a desktop computer, a notebook computer, or a smart phone, by using a wired/wireless communication network. An image of the arithmetic device may be transmitted to another device. For example, technologies in which an image on a personal computer (PC) is transmitted to a TV and displayed by the TV, or an image on a PC connected to a projector is presented by the projector, have become widespread.

A screen image, such as a PC image, has a greater proportion of graphic areas, repeated patterns, or flat regions than a general moving picture. In addition, in the screen image, an image is frequently moved in a vertical or horizontal direction by simply scrolling. Thus, there is a need to effectively encode and transmit a screen image in consideration of the characteristics of the screen image.

SUMMARY

Aspects of the exemplary embodiments provide methods and apparatuses for encoding and decoding an image, for effectively determining a skip prediction mode in consideration of characteristics of a screen image, in which a proportion of repeated patterns or flat regions is high.

Aspects of the exemplary embodiments also provide methods and apparatuses for encoding and decoding an image, by which blocks repeated in a current frame and a previous frame are effectively searched for, and a skip prediction mode is applied, thereby increasing compression efficiency and reducing a bit rate.

According to an aspect of an exemplary embodiment, there is provided a method of encoding an image, the method including dividing an input image frame into blocks having a predetermined size; generating representative values of the blocks by using pixel values of the blocks; searching for a previous block having a representative value that is the same as a representative value of a current block by applying a plurality of skip prediction modes and comparing at least one representative value of previous blocks from among representative values of previous blocks of the current frame encoded prior to the current block and representative values of previous blocks of a previous frame with a representative value of the current block; and adding skip prediction mode information used to search for the previous block having the representative value that is the same as the representative value of the current block to a bitstream.

According to another aspect of an exemplary embodiment, there is provided a method of decoding an image, the method including parsing a received bitstream; extracting prediction mode information of a current block from the parsed bitstream, the prediction mode information indicating one of a plurality of skip prediction modes; determining whether the extracted prediction mode information indicates any of the plurality of skip prediction modes using at least one of previous blocks of a current frame that is encoded prior to the current block and previous blocks of a previous frame; selecting one of the previous blocks of the current frame and the previous blocks of the previous frame, based on the skip prediction mode of the current block; and determining the selected previous block as a restoration value of the current block.

According to another aspect of an exemplary embodiment, there is provided an apparatus for encoding an image, the apparatus including a representative value generating unit that divides an input image frame into blocks having a predetermined size and generates representative values of the blocks based on pixel values of the blocks; a representative value comparison unit that searches for a previous block having a representative value that is the same as a representative value of a current block by applying a plurality of skip prediction modes and compares at least one representative value of previous blocks from among representative values of previous blocks of the current frame encoded prior to the current block and representative values of previous blocks of a previous frame with a representative value of the current block; and an entropy encoder that adds skip prediction mode information used to search for the previous block having the representative value that is the same as the representative value of the current block to a bitstream.

According to another aspect of an exemplary embodiment, there is provided an apparatus for decoding an image, the apparatus including a parsing unit that parses a received bitstream and extracts prediction mode information of a current block from the parsed bitstream, the prediction mode information indicating one of a plurality of skip prediction modes; an entropy decoder that determines whether the extracted prediction mode information indicates any of the plurality of skip prediction modes using at least one of previous blocks of a current frame that is encoded prior to the current block and previous blocks of a previous frame; and a skip block restoring unit that selects one of the previous blocks of the current frame and the previous blocks of the previous frame, based on the skip prediction mode of the current block, and determines the selected previous block as a restoration value of the current block.

BRIEF DESCRIPTION OF THE DRAWINGS

The above and other aspects will become more apparent by describing in detail exemplary embodiments, with reference to the attached drawings in which.

DETAILED DESCRIPTION OF THE EXEMPLARY EMBODIMENTS

Hereinafter, the aspects of the exemplary embodiments will be described in detail with reference to the attached drawings.

Figure 1:
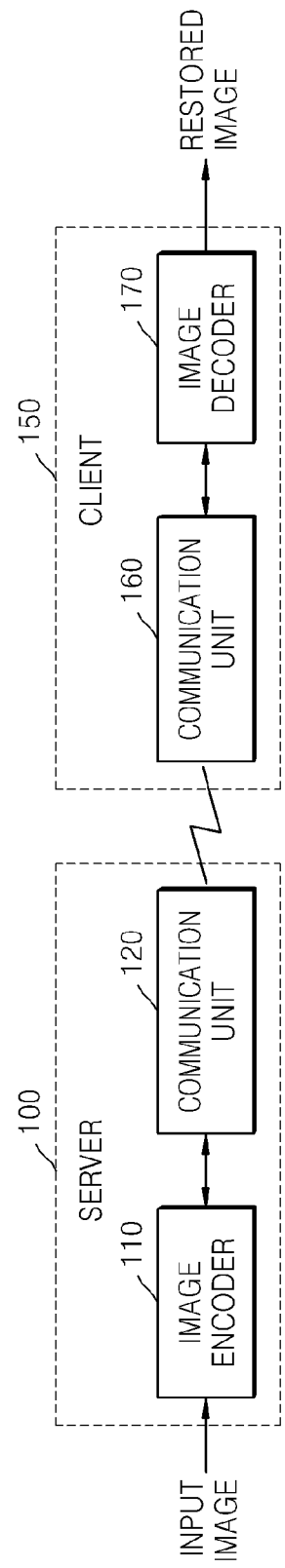
FIG. 1 is a block diagram of an image transmitting system according to an exemplary embodiment.

FIG. 1 is a block diagram of an image transmitting system according to an exemplary embodiment.

Referring to FIG. 1, a server 100 may be an arithmetic unit, such as a personal computer (PC) that receives an input image, and includes an image encoder 110 for encoding a screen image obtained by capturing an image that is processed therein and a communication unit 120 for transmitting the encoded screen image to an external device. The server 100 may include any device capable of processing an image, for example, such as a desktop computer, a notebook computer, or a smart phone.

A client 150 includes a communication unit 160 for receiving a bitstream transmitted from the server 100 and an image decoder 170 for decoding the received bitstream to restore an image and output the restored image. The communication units 120 and 160 of the server 100 and the client 150, respectively, may perform mutual communication by using various wired methods using a high definition multimedia interface (HDMI) terminal, a component terminal, a RGB terminal, or the like, or may perform communication via various wireless communication standards, such as wireless fidelity (WiFi), wireless high definition (WiHD), wireless home digital interface (WHDi), Bluetooth, ZigBee, Wibro, and long term evolution (LTE).

The client 150 may include any device capable of processing an image, for example, such as a desktop computer, a notebook computer, or a smart phone.

Figure 2:
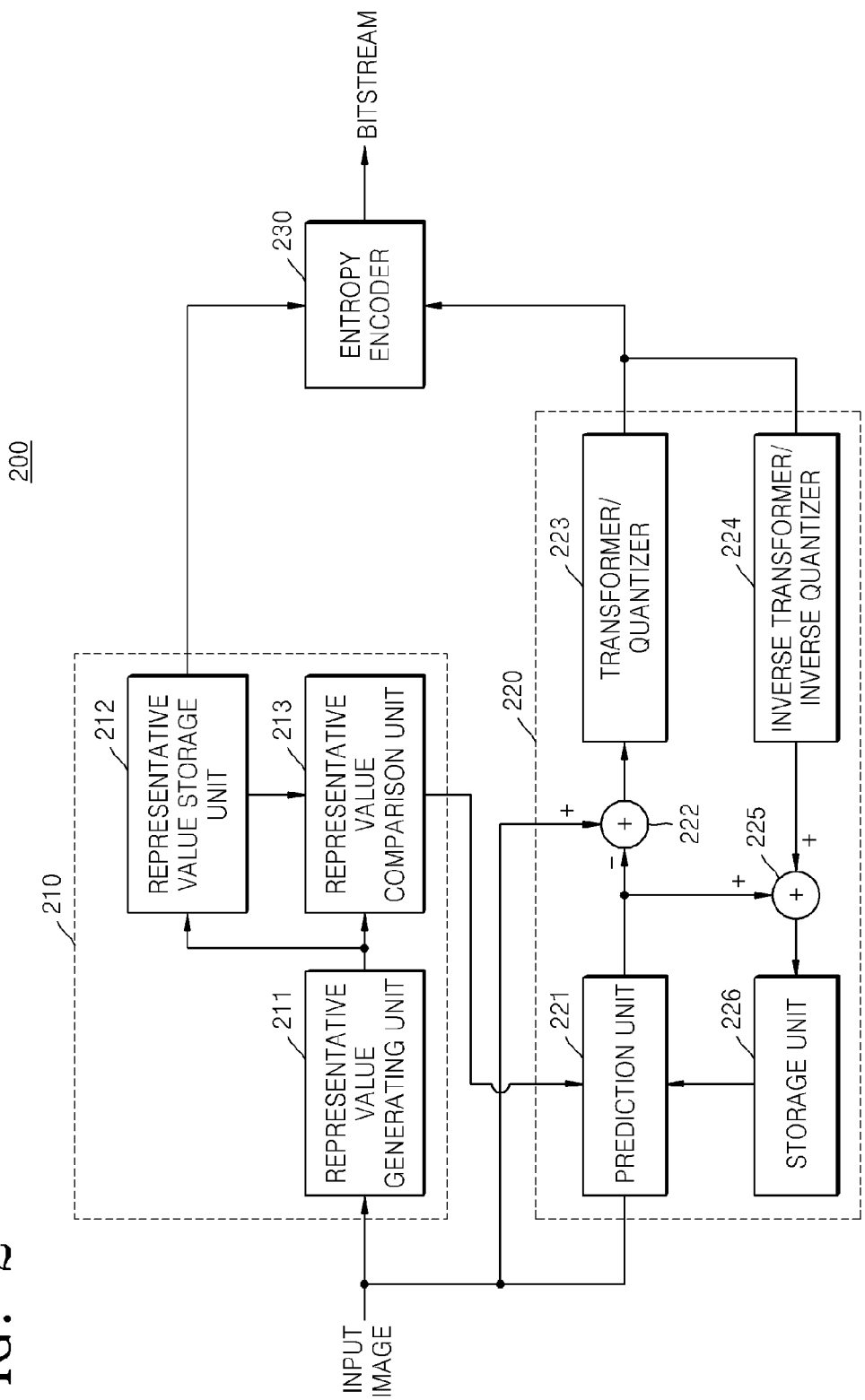
FIG. 2 is a block diagram of an image encoding apparatus according to an exemplary embodiment.

FIG. 2 is a block diagram of an image encoding apparatus 200 according to an exemplary embodiment. The image encoding apparatus 200 of FIG. 2 may be used as the image encoder 110 of the server 100 of FIG. 1.

Referring to FIG. 2, the image encoding apparatus 200 includes a skip mode determining unit 210, an intra/inter predicting unit 220, and an entropy encoder 230.

The skip mode determining unit 210 applies a plurality of skip prediction modes to search for a reference block that is the same as a current block and output skip prediction mode information that is used in the searching operation when the reference block that is the same as the current block exists. For example, the plurality of skip prediction modes includes a first skip prediction mode, in which the current block is compared with a block of a previous frame at the same position as the current block, a second skip prediction mode, in which previous blocks of a current frame are compared with the current block, and a third skip prediction mode, in which previous blocks of a previous frame are compared with the current block. In order to effectively apply the plurality of skip prediction modes, the skip mode determining unit 210 determines whether the current block is the same as a reference block by using a representative value that is generated in units of blocks that are obtained by dividing an input image frame.

Figure 3:
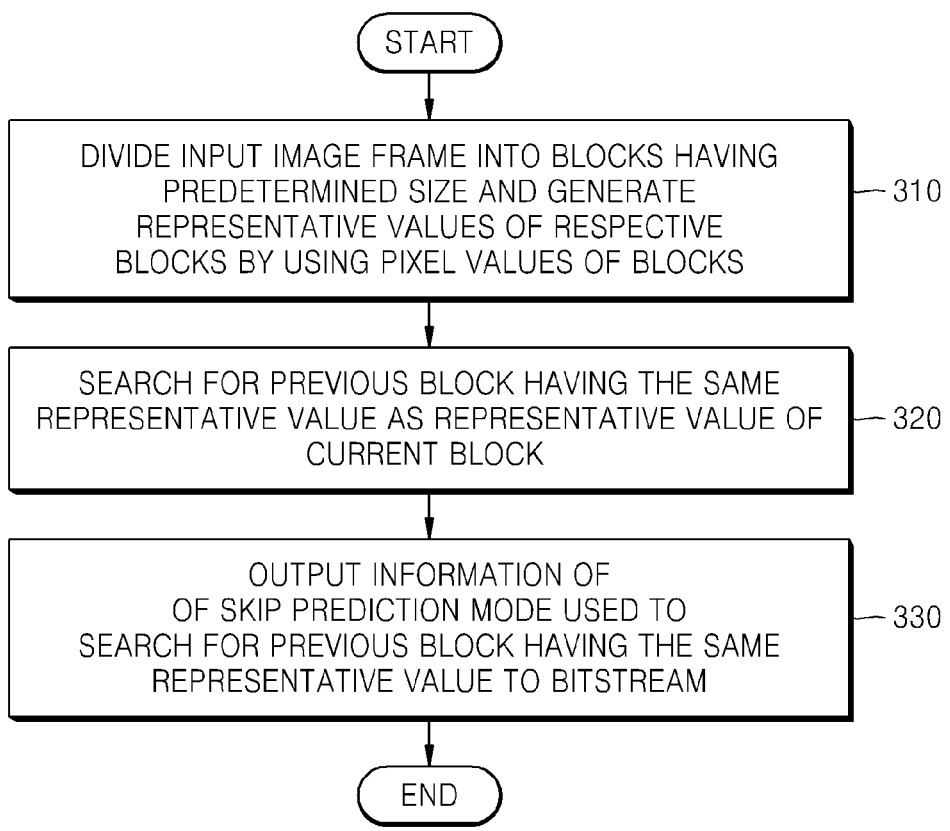
FIG. 3 is a flowchart of a method of encoding an image according to an exemplary embodiment.

In detail, the skip mode determining unit 210 includes a representative value generating unit 211, a representative value storage unit 212, and a representative value comparison unit 213. Hereinafter, an operation of the skip mode determining unit 210 will be described in detail. FIG. 3 is a flowchart of a method of encoding an image according to an exemplary embodiment.

Referring to FIGS. 2 and 3, in operation 310, the representative value generating unit 211 divides an input image frame into blocks having a predetermined size and generates representative values of the respective blocks by using pixel values of the blocks. The representative values of the respective blocks may be stored in the form of a table in the representative value storage unit 212.

In operation 320, the representative value comparison unit 213 may search for a previous block having the same representative value as a representative value of a current block by applying a plurality of skip prediction modes and comparing at least one representative value of previous blocks from among representative values of previous blocks of the current frame, which are encoded prior to the current block, and representative values of previous blocks of a previous frame with a representative value of the current block. In this case, when a difference value between the representative value of the current block and a representative value of a previous block is equal to or less than a predetermined threshold value, the representative value comparison unit 213 considers that a found previous block is the same as the current block. In addition, the plurality of skip prediction modes includes a first skip prediction mode, in which the current block is compared with a block of a previous frame at the same position as the current block, a second skip prediction mode, in which previous blocks of a current frame are compared with the current block, and a third skip prediction mode, in which previous blocks of a previous frame are compared with the current block.

In operation 330, when a plurality of skip prediction modes are applied, if a previous block having the same representative value as a representative value of the current block exists, the representative value comparison unit 213 outputs information about a skip prediction mode that is used in a searching operation and position information of a found reference block to the entropy encoder 230. The entropy encoder 230 adds only information of a skip prediction mode, which is used as encoding information, and location information of a reference block to a bitstream.

As a search result of the representative value comparison unit 213, although a plurality of skip prediction modes are applied, when a previous block having the same representative value as the representative value of the current block among previous blocks of a current frame or previous blocks of previous frame does not exist, the intra/inter predicting unit 220 prediction-encodes the current block by applying a general intra and inter prediction mode. In detail, a prediction unit 221 performs inter-prediction for generating a motion vector indicating a similar region to a current block in a predetermined search range of a reference picture that is encoded and restored and performs intra-prediction for generating a prediction block by using data of a neighboring block adjacent to the current block. A subtraction unit 222 generates and outputs a residual signal that is a difference value between a prediction block and an original input block. A transformer/quantizer 223 transforms the residual signal in a frequency region, and quantizes and outputs the transformed residual signal based on a predetermined quantization. The transformed and quantized signal is encoded by the entropy encoder 230 and is output in a bitstream. In order to use the residual signal to encode a next block, an inverse transformer/inverse quantizer 224 inversely quantizes and transforms the transformed and quantized signal to restore a residual signal. A restoring unit 225 adds a prediction signal to the restored residual signal to restore the encoded current block. The restored current block is stored in a storage unit 226 and then is used as a reference block when a next block is encoded.

Figure 4:
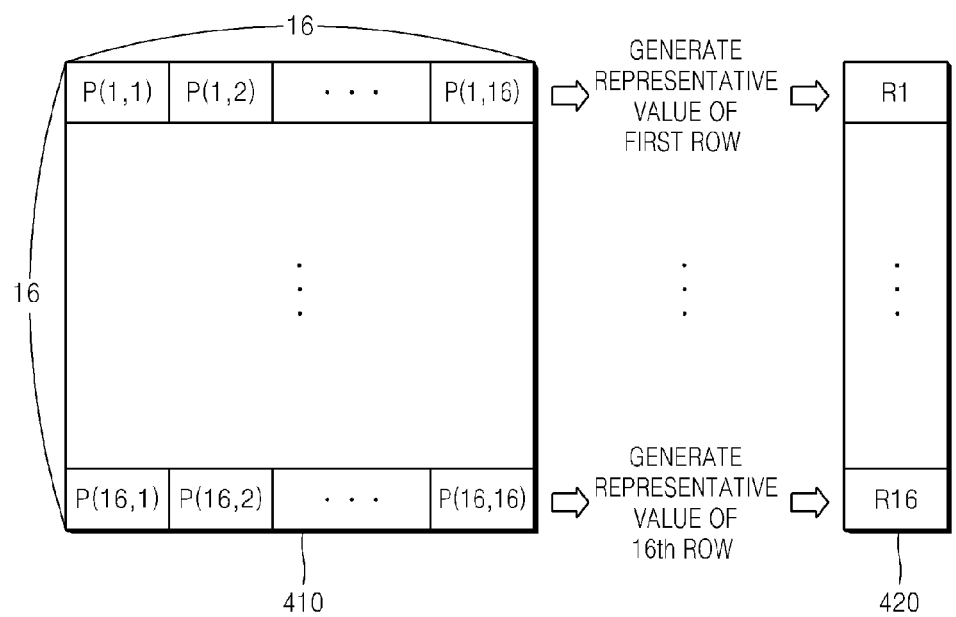
FIG. 4 is a reference diagram for explaining an operation of generating a representative value of a block, according to an exemplary embodiment.

FIG. 4 is a reference diagram for explaining an operation of generating a representative value of a block, according to an exemplary embodiment.

Referring to FIG. 4, the representative value generating unit 211 may divide an input block into sub-blocks having a predetermined size, may generate sub-representative values on a sub-block-by-sub-block basis, and may set a one or more of the generated sub-representative values as a representative value of a block. For example, as shown in FIG. 4, the representative value generating unit 211 may divide the input block in line units of a row direction of an input 16×16 macroblock 410 and may generate sub-representative values in line units of a row direction. That is, the representative value generating unit 211 generates a sub-representative value R1 representing pixel values of a first row by using pixel values P(1,1) through P(1,16) of the first row. A sub-representative value may be generated by using at least one of a mean, a variance, a cyclic redundancy check (CRC) code, and a hash code of pixels in sub-block units. Similarly, the representative value generating unit 211 generates a sub-representative value Rn by using pixel values included in lines of an $n_{th}$ (where n is an integer) row direction. Likewise, when a representative value 420 of the input 16×16 macroblock 410 that is a current block including sub-representative values R1 through R16 of all lines of 16 row directions is generated, the representative value storage unit 212 stores the representative value 420 for use in a search operation. A representative value 420 may be stored in the form of a table.

The representative value generating unit 211 is not limited to the above-described example. That is, the representative value generating unit 211 may generate sub-representative values in line units of a column direction or may divide a macroblock into sub-block units with a size of m×n (where m and n are both integers) and may generate sub-representative values on a sub-block-by-sub-block basis.

The representative value comparison unit 213 compares a representative value of a current block with representative values of previous blocks according to a plurality of skip prediction modes and searches for a previous block having the same representative value as the current block. According to an exemplary embodiment, since a block is searched for based on a representative value, rather than being searched for on a pixel-by-pixel basis, search speed may be increased and computational complexity of a search operation may be reduced.

Figure 5:
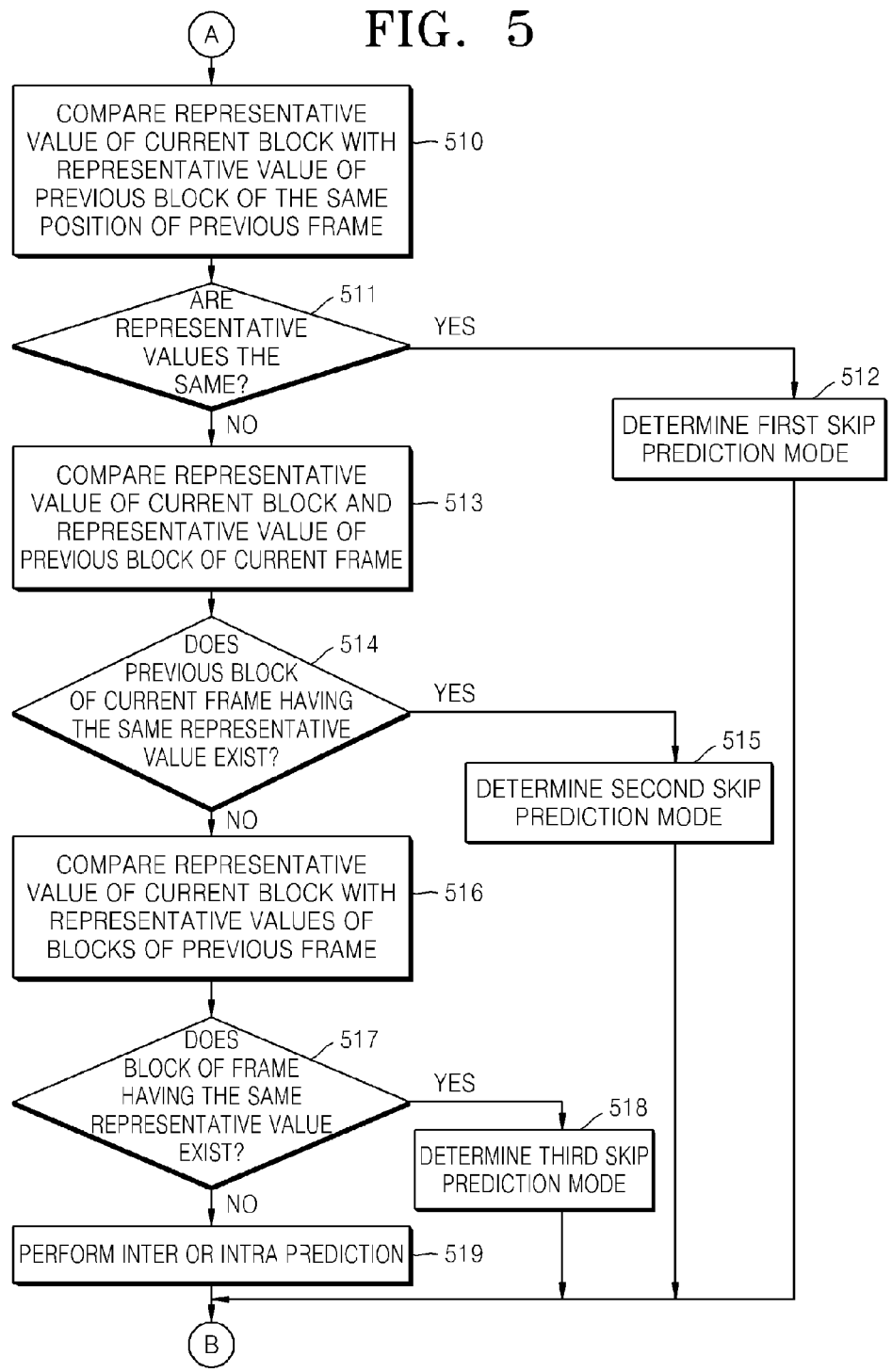
FIG. 5 is a flowchart of an operation of determining a plurality of skip prediction modes, according to an exemplary embodiment.

FIG. 5 is a flowchart of an operation of determining a plurality of skip prediction modes, according to an exemplary embodiment.

Referring to FIG. 5, in operation 510, the representative value comparison unit 213 applies a first skip prediction mode and compares a representative value of a current block with a representative value of a previous block at the same position of a previous frame. The operations in FIG. 5 will now be described with reference to FIG. 6.

Figure 6:
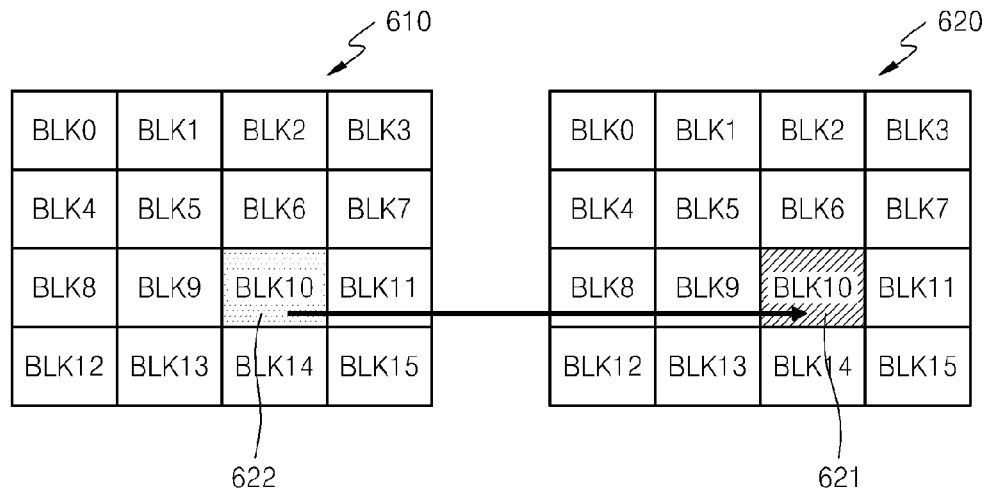
FIG. 6 is a reference diagram for explaining a relationship between a current block and a previous frame, which is used to determine a first skip prediction mode, according to an exemplary embodiment.

FIG. 6 is a reference diagram for explaining a relationship between a current block and a previous frame, which is used to determine a first skip prediction mode, according to an exemplary embodiment. In FIG. 6, it is assumed that a current block encoded in a current frame 620 is a block BLK10 621. When a search operation is performed in the first skip prediction mode, the representative value comparison unit 213 compares a representative value of a block 622 at the same position as the current block in a previous frame 610 with the current block 621. In operation 511, when it is determined that the representative value of the current block 621 is the same as the representative value of the block 622 at the same position in the previous frame 610, the representative value comparison unit 213 determines a prediction mode of a current block in the first skip prediction mode and outputs the determination result to the entropy encoder 230, in operation 512. Encoding information of a current block determined in the first skip prediction mode includes only information about the first skip prediction mode without any separate information. When a decoding side receives a block that is encoded in the first skip prediction mode, a block of the same position of a previous frame may be copied to restore the block.

As the determination result of operation 511, when it is determined that the representative value of the current block 621 is not the same as the representative of the block 621 of the same position in the previous frames 622, the representative value comparison unit 213 compares the representative value of the current block and the representative value of a previous block of a current frame in a second skip prediction mode, in operation 513. The operations in FIG. 5 will now be described with reference to FIG. 7.

Figure 7:
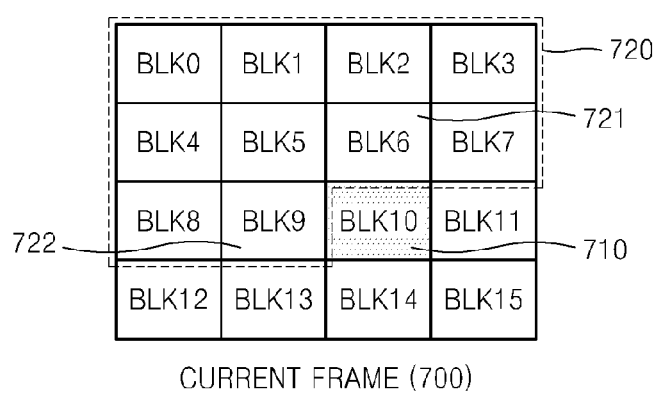
FIG. 7 is a reference diagram for explaining a relationship between a current block and a previous block of a current frame, which is used to determine a second skip prediction mode, according to an exemplary embodiment.

FIG. 7 is a reference diagram for explaining a relationship between a current block and a previous block of a current frame, which is used to determine a second skip prediction mode, according to an exemplary embodiment. In FIG. 7, it is assumed that a current block encoded in a current frame 700 is a block BLK10 710. When a zigzag scanning order is applied, blocks BLK0 through BLK9 are encoded and then restored prior to the current block BLK10 710. When a search operation is performed in the second skip prediction mode, the representative value comparison unit 213 searches for a previous block having the same representative value as the current block BLK10 710 from among the previous blocks 720 that are previously encoded in the current frame 700. As the determination result of operation 514, when a previous block of a current frame having the same representative value as a representative value of the current block 710 exists, the representative value comparison unit 213 determines a prediction mode of a current block in the second skip prediction mode and outputs the determination result to the entropy encoder 230, in operation 515. In addition, the representative value comparison unit 213 outputs index information indicating position information of a previous block of the found current frame to the entropy encoder 230. Encoding information of a current block encoded in the second skip prediction mode includes second skip prediction mode information and position information of the found previous block. The position information of the found previous block may be encoded by using various entropy encoding methods such as an exponential Golomb code.

The representative value comparison unit 213 may prioritize a search order of previous blocks that are searched for when a search operation is performed in the second skip prediction mode and may search only a search region having high priority. For example, the representative value comparison unit 213 may search for only a previous block BLK6 721 and a left block BLK9 722, which are positioned above the current block 710, instead of comparing a representative value of all previous blocks 720 that are encoded prior to the current block 710 with a representative value of the current block 710. In addition, only intra prediction instead of a skip prediction mode may be performed on a block BLK0 that is a top left portion of a current frame. When leftmost blocks BLK4, BLK8, and BLK12, except for the top left block BLK0, are prioritized and a search operation is performed, only a representative value of a previous block that is just above the current block may be compared. For example, when a current is a block BLK8 that is adjacent to a left boundary, a previous block is searched for to determine whether the second skip prediction mode is applied, the representative value comparison unit 213 may compare a representative value of only the block BLK4 that is just above the current block with a representative value of the block BLK8. When a search order is prioritized without using representative values of previous blocks in a current frame and a representative value of a current block, search speed may be increased. In addition, when a scene change occurs between a previous frame and the current frame or the current frame is an intra frame, the representative value comparison unit 213 may skip a first skip prediction mode and a third skip prediction mode and may perform a search operation by using a second skip prediction mode only.

As the determination result of operation 514, when a previous block of a current frame having the same representative value as a representative value of the current block does not exist, the representative value comparison unit 213 may compare a representative value of the current block with representative values of blocks of a previous frame in the third skip prediction mode, in operation 516. According to an exemplary embodiment, the representative value comparison unit 213 may determine a search region to be searched in blocks of a previous frame in consideration of a scrolling direction between the previous frame and a current frame, in order to limit an object to be searched for when a representative value of the previous frame is compared with a representative value of the current block. The operations in FIG. 5 will now be described with reference to FIGS. 8 and 9.

Figure 8:
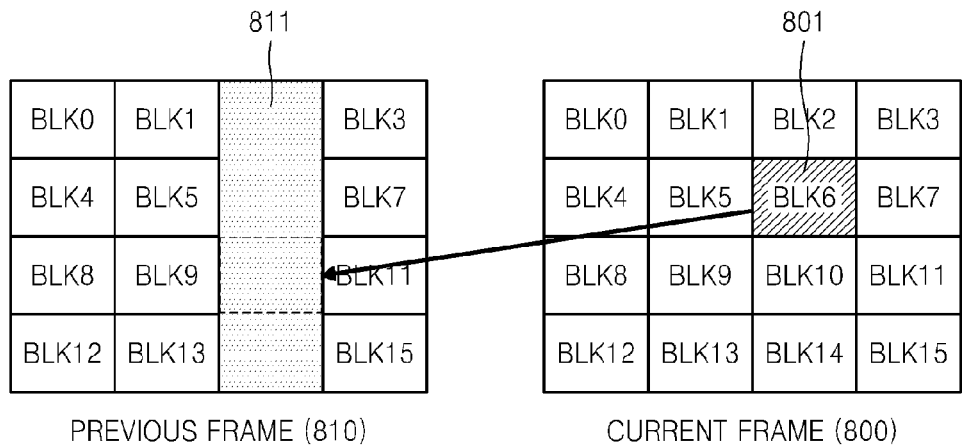
FIG. 8 shows an operation of determining an object to be searched for, when a vertical-direction scroll is positioned between a current frame and a previous frame, according to an exemplary embodiment.
Figure 9:
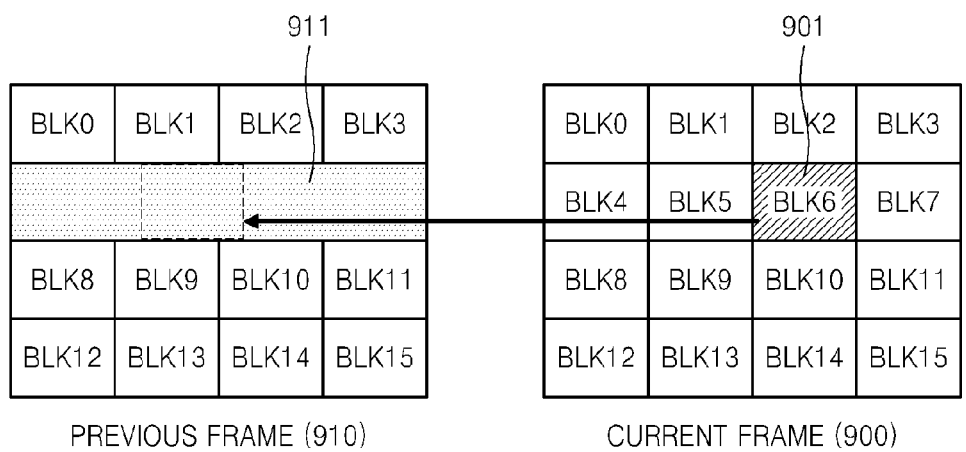
FIG. 9 shows an operation of determining an object to be searched for, when a horizontal-direction scroll is positioned between the current frame and the previous frame, according to an exemplary embodiment.

FIGS. 8 and 9 are reference diagrams for explaining an operation of determining an object to be searched for in a previous frame in consideration of a direction of scrolling, when a search operation is performed to determine a third skip prediction mode, according to an exemplary embodiment. FIG. 8 shows an operation of determining the object to be searched for when a vertical-direction scroll is positioned between a current frame and a previous frame. FIG. 9 shows an operation of determining the object to be searched for when a horizontal-direction scroll is positioned between the current frame and the previous frame.

Referring to FIG. 8, when the vertical-direction scroll is positioned between a current frame 800 and a previous frame 810, a similar block that is similar to a current block BLK6 801 is likely to be positioned along a perpendicular direction corresponding to the scrolling direction with respect to a current block. Thus, the representative value comparison unit 213 may determine, as an object to be searched for, previous blocks 811 that are positioned in a perpendicular direction to a block of the same position as a current block BLK6 801, instead of comparing representative values of all blocks of the previous frame 810 with a representative value of the current block BLK6 801, and may compare only representative values of the previous blocks 811 included in the object to be searched for.

Similarly, referring to FIG. 9, when the horizontal-direction scroll is positioned between a current frame 900 and a previous frame 910, a similar block that is similar to a current block BLK6 901 is likely to be positioned along a horizontal direction corresponding to the scrolling direction with respect to a current block. Thus, the representative value comparison unit 213 may determine, as an object to be searched for, previous blocks 911 that are positioned in a horizontal direction with respect to a block of the same position as a current block BLK6 901, instead of comparing representative values of all blocks of the previous frame 910 with a representative value of the current block BLK6 901, and may compare only representative values of the previous blocks 911 included in the object to be searched for.

A scrolling direction between a previous frame and a current frame may be determined based on a global motion vector between the previous frame and the current frame or may be determined in consideration of a search direction that is transmitted from the client 150 to the server 100 through a predetermined input device in the image transmitting system of FIG. 1. For example, when a user of the client 150 that receives a screen image transmitted from the server 100 makes a request for a screen image that is transferred in a horizontal direction by holding and dragging a mouse in a horizontal direction, the image encoder 110 of the server 100 may determine the scrolling direction as a horizontal direction in consideration of the user's input and may determine a search region for determining the third skip prediction mode.

As the determination result of operation 517, when a previous block of a previous frame having the same value as a representative value of a current block exists, the representative value comparison unit 213 determines a prediction mode of a current block in a third skip prediction mode and outputs the determination result to the entropy encoder 230, in operation 518. In addition, the representative value comparison unit 213 outputs index information indicating position information of a previous block of a found previous frame to the entropy encoder 230. Encoding information of a current block that is encoded in the third skip prediction mode includes third skip prediction mode information and position information of the found previous block.

As the determination result of operation 517, when a previous block of a previous frame having the same value as a representative value of a current block does not exist, the intra/inter predicting unit 220 encodes the current block by using various intra/inter prediction methods instead of encoding the current block in a skip prediction mode, in operation 518.

Thus far, the skip prediction mode is performed in an order of the first skip prediction mode, the second skip prediction mode, and the third skip prediction mode. Alternatively, an order of the first through third skip prediction modes may be changed. For example, a skip prediction mode with a highest occurrence probability is prioritized from among the first through third skip prediction modes and the skip prediction modes may be performed.

Hereinafter, an example of a syntax structure 'encode_block( )' in block units will be described. In the syntax structure 'encode_block( )', it is assumed that the first skip prediction mode is Skip_flag, the second skip prediction mode is SKIP_SPATIAL, and the third skip prediction mode is SKIP_SCROLL.

```
encode_block( )
{
    skip_flag
    if(skip_flag == 0) {
        blk_mode
        if(blk_mode == SKIP_SPATIAL) {
            if(INTRA_frame) {
                upper_match
                if(upper_match == 0) {
                    spatial_index_x
                    spatial_index_y
                }
            }
            else {
                left_match
                if(left_match == 0) {
                    upper_match
                    if(upper_match == 0) {
                        spatial_index_x
                        spatial_index_y
                    }
                }
            }
        }
        else if(blk_mode == SKIP_SCROLL) {
            vertical_index or horizontal_index
        }
        else {
            encode_INTRA( ) or Inter( )
        }
    }
}
```

With regard to the syntax structure 'encode_block( )', when skip_flag=1, that is, the first skip prediction mode is applied, only first skip prediction information is added to a current block and syntax is terminated. When skip_flag=0, that is, a skip prediction mode is not determined as the first skip prediction mode, whether the skip prediction mode corresponds to the second skip prediction mode and the third skip prediction mode is determined, and the determination mode information is inserted into blk_mode.

When blk_mode=SKIP_SPATIAL and a current frame is a frame INTRA, whether a block with a predetermined position having priority, for example, a current block corresponds to an upper block is determined (upper_match). When upper_match=0, position information (spatial_index_x and spatial_index_y) of a previous block that is searched for in a search region is inserted.

When blk_mode=SKIP_SPATIAL and the current frame is not the frame INTRA, whether the block corresponds to a left block is indicated (left_match)

When left_match=0, whether the current block corresponds to an upper block based on 'upper_match' is indicated.

When upper_match=0, position information (spatial_index_x and spatial_index_y) of a previous block that is found in a search region is inserted.

When blk_mode=SKIP_SCROLL, vertical_index or horizontal_index indicating a block corresponding to the current block in a previous frame is inserted. As described above, vertical_index or horizontal_index may be added as position information in consideration of the scroll direction.

When blk_mode is not any one of SKIP, SKIP_SPATIAL, and SKIP_SCROLL, the current block is coded in a prediction mode INTRA or INTER.

Figure 10:
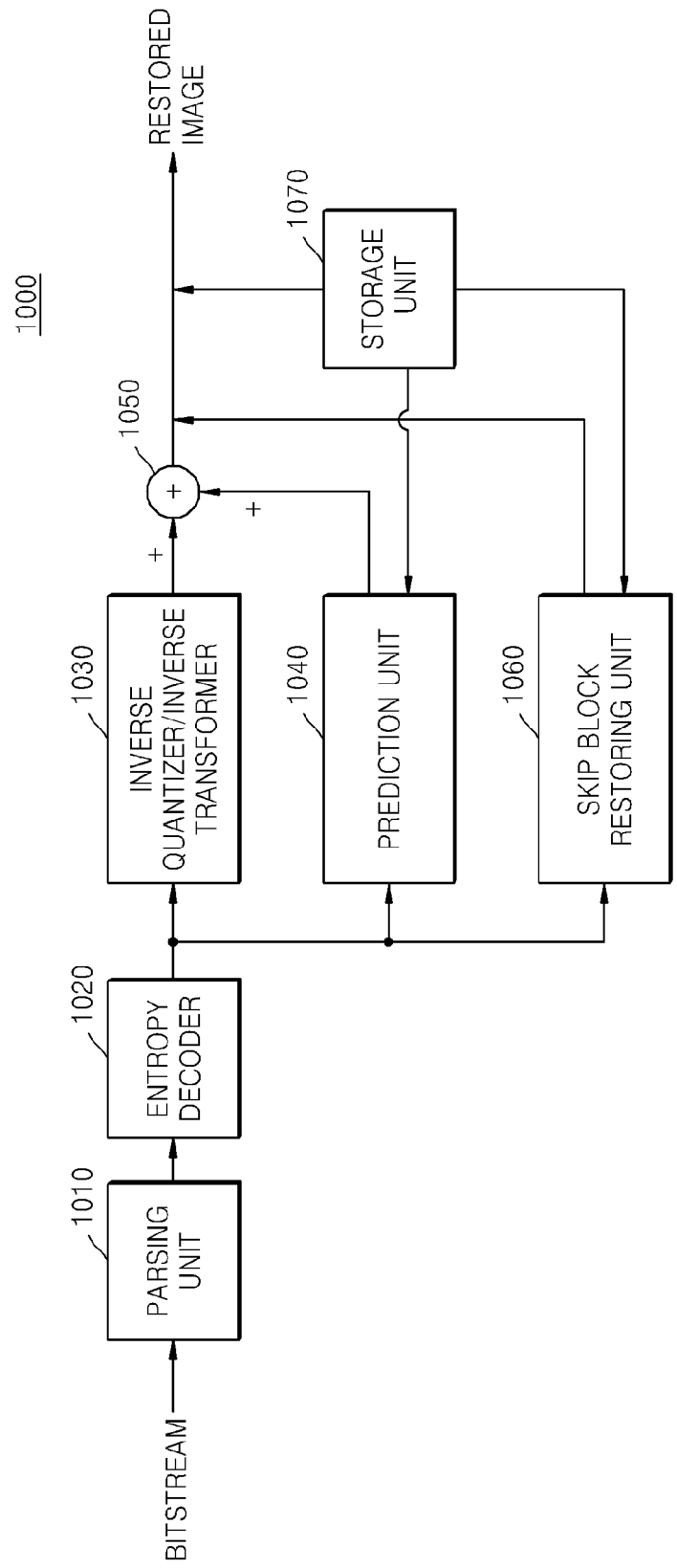
FIG. 10 is a block diagram of an image decoding apparatus according to an exemplary embodiment.

FIG. 10 is a block diagram of an image decoding apparatus 1000 according to an exemplary embodiment. The image decoding apparatus 1000 of FIG. 10 may be used as the image decoder 170 of the client 150 of FIG. 1.

Referring to FIG. 10, the image decoding apparatus 1000 includes a parsing unit 1010, an entropy decoder 1020, an inverse quantizer/inverse transformer 1030, a prediction unit 1040, a restoring unit 1050, a skip block restoring unit 1060, and a storage unit 1070.

The parsing unit 1010 extracts prediction mode information that is decoded from a bitstream. If a current block is encoded in an intra or inter prediction mode, the entropy decoder 1020 outputs corresponding data to the inverse quantizer/inverse transformer 1030 and the prediction unit 1040. The inverse quantizer/inverse transformer 1030 performs inverse quantization and inverse transformation to restore a residual signal. The prediction unit 1040 generates and outputs the prediction mode information that is extracted with respect to the current block in an intra or inter prediction mode. The restoring unit 1050 adds the prediction signal and the residual signal and restores a block that is encoded in the intra or inter prediction mode.

When a prediction mode of the current block corresponds to any one of the first through third skip modes, the skip block restoring unit 1060 selects any one of previous blocks of a current frame and previous blocks of a previous frame, based on a skip prediction mode of the current block, and determines the selected previous block as a restoration value of the current block. That is, when the current block is encoded in the first skip prediction mode, the skip block restoring unit 1060 copies a block of the same position of the restored previous frame and determines the block as the restoration value. When the current block is encoded in the second skip prediction mode, the skip block restoring unit 1060 extracts position information of a previous block in a current frame from a bitstream, copies a previous block of a current frame positioned in the extracted previous block, and determines the previous block as the restoration value of the current block. When the current block is encoded in the third skip prediction mode, the skip block restoring unit 1060 extracts position information of a block of a previous frame from a bitstream, copies a previous block of the extracted previous frame, and determines the previous block as a restoration value.

The current block that is restored by the restoring unit 1050 or the skip block restoring unit 1060 may be stored in the storage unit 1070 and then may be used as reference data for decoding a next block.

Figure 11:
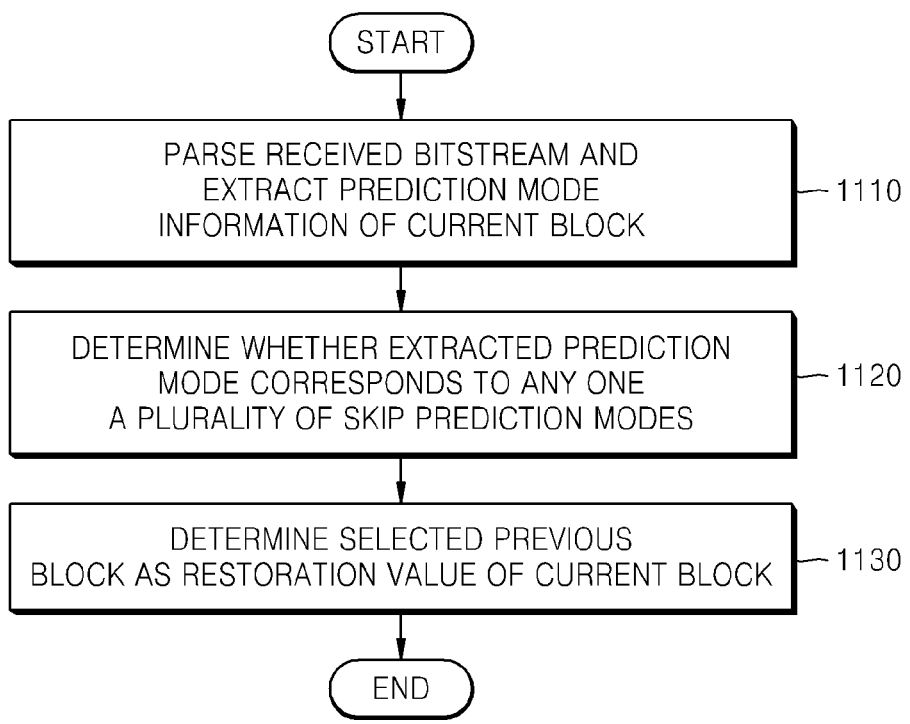
FIG. 11 is a flowchart of a method of decoding an image, according to an exemplary embodiment.

FIG. 11 is a flowchart of a method of decoding an image, according to an exemplary embodiment.

Referring to FIG. 11, in operation 1110, the parsing unit 1010 extracts prediction mode information of a current block to be decoded from a bitstream.

In operation 1120, the entropy decoder 1020 determines whether the extracted prediction mode corresponds to any one of a plurality of skip prediction modes using at least one of previous blocks of a current frame that is encoded prior to the current block and previous blocks of a previous frame, outputs data that is encoded by intra or inter prediction to the inverse quantizer/inverse transformer 1030 and the prediction unit 1040, and outputs data of a block that is encoded in any one of a plurality of skip prediction modes to the skip block restoring unit 1060.

In operation 1130, when a prediction mode of a current block corresponds to any one of the plurality of skip prediction modes, the skip block restoring unit 1060 selects any one of previous blocks of a current frame and previous blocks of a previous frame, based on a skip prediction mode of a current block, and determines the selected previous block as a restoration value of the current block.

According to one or more exemplary embodiments, only skip prediction mode information of a corresponding block and position information of a reference block are encoded with respect to a block that is encoded and transmitted in a plurality of skip prediction modes, thereby reducing a bit rate generated during encoding and increasing compression efficiency.

The exemplary embodiments may be embodied as computer programs and can be implemented in general-use digital computers that execute the programs using a computer readable recording medium. Examples of the computer readable recording medium include magnetic storage media (e.g., ROM, floppy disks, hard disks, etc.), and storage media such as optical recording media (e.g., CD-ROMs, or DVDs).

As will also be understood by the skilled artisan, the exemplary embodiments may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

While the present application has been particularly described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, the method comprising:
    dividing an input image frame into blocks having a predetermined size;
    generating representative values of the blocks based on pixel values of the blocks;
    searching for a previous block having a representative value that is the same as a representative value of a current block by applying a plurality of skip prediction modes and comparing at least one representative value of previous blocks from among representative values of previous blocks of a current frame encoded prior to the current block and representative values of previous blocks of a previous frame with a representative value of the current block; and
    adding skip prediction mode information used to search for the previous block having the representative value that is the same as the representative value of the current block to a bitstream.

2. The method of claim 1, wherein the image is a screen image that is output from an arithmetic unit.

3. The method of claim 1, wherein the representative values of the blocks comprise sub-representative values that are generated on a sub-block-by-sub-block basis, and sub-blocks are obtained by dividing each of the blocks having the predetermined size.

4. The method of claim 3, wherein each sub-block comprises a line of pixels in a row direction or a column direction.

5. The method of claim 3, wherein the sub-representative value is generated by using at least one of a mean, a variance, a cyclic redundancy check (CRC) code, and a hash code of pixels in the sub-blocks.

6. The method of claim 1, wherein the plurality of skip prediction modes comprises:
    a first skip prediction mode in which a representative value of the current block is compared with a representative value of a block of a previous frame at a same position as the current block;
    a second skip prediction mode in which representative values of previous blocks of the current frame are compared with a representative value of the current block; and
    a third skip prediction mode in which representative values of previous blocks of a previous frame are compared with a representative value of the current block.

7. The method of claim 6, wherein, in the third skip prediction mode, a search region to be searched is determined in blocks of a previous frame in consideration of a scrolling direction between the previous frame and the current frame and only previous blocks in the search region are searched.

8. The method of claim 7, wherein previous blocks that are positioned in the scrolling direction with respect to a block of a position that is the same position as the current block from among blocks of the previous frame are determined as the search region.

9. The method of claim 6, wherein, in response to a scene change occurring between the previous frame and the current frame or the current frame being an intra frame, the first skip prediction mode and the third skip prediction mode are skipped and the searching is performed using the second skip prediction mode.

10. The method of claim 6, wherein, in the second skip prediction mode, a block adjacent to the current block is prioritized and the searching is performed.

11. The method of claim 6, wherein the adding comprises, in response to the previous block having the same representative value not being a block of a predetermined position, adding position information of the previous block having the same representative value to the bitstream.

12. A method of decoding an image, the method comprising:
    parsing a received bitstream;
    extracting prediction mode information of a current block from the parsed bitstream, the prediction mode information indicating one of a plurality of skip prediction modes;
    determining whether the extracted prediction mode information indicates any of the plurality of skip prediction modes using at least one of previous blocks of a current frame that is encoded prior to the current block and previous blocks of a previous frame;
    selecting one of the previous blocks of the current frame and the previous blocks of the previous frame, based on the skip prediction mode of the current block; and
    determining the selected previous block as a restoration value of the current block.

13. The method of claim 12, wherein the plurality of skip prediction modes comprises:
    a first skip prediction mode in which a representative value of the current block is compared with a representative value of a block of a previous frame at a same position as the current block;
    a second skip prediction mode in which representative values of previous blocks of the current frame are compared with a representative value of the current block; and
    a third skip prediction mode in which representative values of previous blocks of a previous frame are compared with a representative value of the current block.

14. The method of claim 13, wherein the determining of the selected previous block as a restoration value of the current block comprises, in response to the prediction mode of the current block being the first skip prediction mode, copying a block of a position that is a same position of a restored previous frame and determining the block as the restoration value of the current block.

15. The method of claim 13, wherein the determining of the selected previous block as a restoration value of the current block comprises, in response to the prediction mode of the current block being the second skip prediction mode, extracting position information of a previous block in a current frame from a bitstream, copying the previous block of the current frame based on the extracted position information, and determining the previous block as the restoration value of the current block.

16. The method of claim 13, wherein the determining of the selected previous block as a restoration value of the current block comprises, in response to the prediction mode of the current block being the third skip prediction mode, extracting position information of a previous frame from a bitstream, copying a previous block of the extracted previous frame, and determining the previous block as the restoration value of the current block.

17. An apparatus for encoding an image, the apparatus comprising:
   a representative value generating unit that divides an input image frame into blocks having a predetermined size and generates representative values of the blocks based on pixel values of the blocks;
   a representative value comparison unit that searches for a previous block having a representative value that is the same as a representative value of a current block by applying a plurality of skip prediction modes and compares at least one representative value of previous blocks from among representative values of previous blocks of a current frame encoded prior to the current block and representative values of previous blocks of a previous frame with a representative value of the current block; and
   an entropy encoder that adds skip prediction mode information used to search for the previous block having the representative value that is the same as the representative value of the current block to a bitstream.

18. An apparatus for decoding an image, the apparatus comprising:
   a parsing unit that parses a received bitstream and extracts prediction mode information of a current block from the parsed bitstream, the prediction mode information indicating one of a plurality of skip prediction modes;
   an entropy decoder that determines whether the extracted prediction mode information indicates any of the plurality of skip prediction modes using at least one of previous blocks of a current frame that is encoded prior to the current block and previous blocks of a previous frame; and
   a skip block restoring unit that selects one of the previous blocks of the current frame and the previous blocks of the previous frame, based on the skip prediction mode of the current block, and determines the selected previous block as a restoration value of the current block.

19. An image encoding method comprising:
   dividing an input image frame into blocks having a predetermined size;
   generating a representative value of a current block of the input image frame to be encoded, based on pixel values of at least one pixel of the current block;
   searching, from among encoded blocks of a previous image frame and encoded blocks of the image frame, for a previous block having a representative value that matches the representative value of the current block;
   in response to a representative value of a previous block and the representative value of the current block being within a threshold value, determining that the previous block matches the current block; and
   encoding the current block based on a result of the searching.

20. The method of claim 19, wherein the representative value is one of a mean, a variance, a cyclic redundancy check (CRC) code, and a hash code of the pixel values of the at least one pixel of the current block.

21. The method of claim 19, wherein the representative value is generated in a unit of a block that represents a two-dimensional array of a plurality of pixels.

22. The method of claim 19, wherein the searching comprises comparing the representative value of the current block on a block-by-block.

* * * * *